US012656755B2

(12) United States Patent
Font Calafell et al.

(10) Patent No.: US 12,656,755 B2
(45) Date of Patent: Jun. 16, 2026

(54) APPLYING TEXTURE PATTERNS TO 3D OBJECT MODELS

(71) Applicant: Peridot Print LLC, Palo Alto, CA (US)

(72) Inventors: Davinia Font Calafell, Sant Cugat del Valles (ES); Marc Borras Camarasa, Sant Cugat del Valles (ES); Cristina Dominguez Manchado, Sant Cugat del Valles (ES); David Mazo Figuerola, Sant Cugat del Valles (ES); Roger Fadurdo Orellana, Sant Cugat del Valles (ES)

(73) Assignee: Peridot Print LLC, Palo Alo (CA)

( * ) Notice: Subject to any disclaimer, the term of this patent is extended or adjusted under 35 U.S.C. 154(b) by 557 days.

(21) Appl. No.: 18/013,830

(22) PCT Filed: Jul. 31, 2020

(86) PCT No.: PCT/US2020/044397
§ 371 (c)(1),
(2) Date: Dec. 29, 2022

(87) PCT Pub. No.: WO2022/025910
PCT Pub. Date: Feb. 3, 2022

(65) Prior Publication Data
US 2023/0288909 A1      Sep. 14, 2023

(51) Int. Cl.
*B33Y 50/02*      (2015.01)
*B22F 10/38*      (2021.01)
(Continued)

(52) U.S. Cl.
CPC .......... *G05B 19/4099* (2013.01); *B22F 10/38* (2021.01); *B22F 10/85* (2021.01);
(Continued)

(58) Field of Classification Search
CPC ...... G05B 19/4099; G05B 2219/49023; G06F 2113/10; B29C 64/393; B33Y 50/02; B22F 10/38; B22F 10/85
See application file for complete search history.

(56) References Cited

U.S. PATENT DOCUMENTS 8,477,154 B2    7/2013  Davis et al.
9,169,968 B2   10/2015  Pettis et al.
(Continued)

FOREIGN PATENT DOCUMENTS

CN            107031040 B       1/2019

*Primary Examiner* — Alvin H Tan
(74) *Attorney, Agent, or Firm* — Michael Dryja

(57) ABSTRACT

A computing device comprising a controller is disclosed herein. The controller is to receive a virtual build volume defining an arrangement of a 3D object model to be used by a 3D printer to generate a 3D object; identify a portion of a surface of the to be generated 3D object that is expected to exhibit at least one of a set of surface quality defects; and modify the 3D object model by applying at least one texture pattern to a portion of the 3D object model corresponding to the identified portion, the texture pattern to be selected based on the expected at least one surface quality defect, to cause a 3D geometrical modification of the portion that is to at least partially mask the expected surface quality defect of a 3D object generated using the modified 3D object model.

19 Claims, 5 Drawing Sheets

(51) Int. Cl.
    *B22F 10/85*         (2021.01)
    *B29C 64/393*      (2017.01)
    *G05B 19/4099*    (2006.01)

(52) U.S. Cl.
    CPC ............ *B29C 64/393* (2017.08); *B33Y 50/02*
               (2014.12); *G05B 2219/49023* (2013.01)

(56)               References Cited

U.S. PATENT DOCUMENTS

| | | | |
|---|---|---|---|
| 9,671,695 | B2 | 6/2017 | Fronczkiewicz et al. |
| 10,016,943 | B2 | 7/2018 | Pettis et al. |
| 10,022,915 | B2 | 7/2018 | Bostick et al. |
| 10,346,708 | B2 | 7/2019 | Young et al. |
| 10,434,573 | B2 | 10/2019 | Buller et al. |
| 10,556,382 | B2 | 2/2020 | Bheda et al. |
| 11,046,009 | B2 * | 6/2021 | Tsoutsos ............... B29C 64/393 |
| 11,138,352 | B2 * | 10/2021 | Chen ........................ G06T 19/20 |
| 11,256,231 | B2 * | 2/2022 | Crothers ............ G05B 13/0265 |
| 2016/0236414 | A1 * | 8/2016 | Reese .................... B33Y 50/02 |
| 2017/0113412 | A1 * | 4/2017 | Adams .............. G05B 19/4099 |
| 2020/0376552 | A1 * | 12/2020 | Fukuda ................. B29C 64/386 |

* cited by examiner

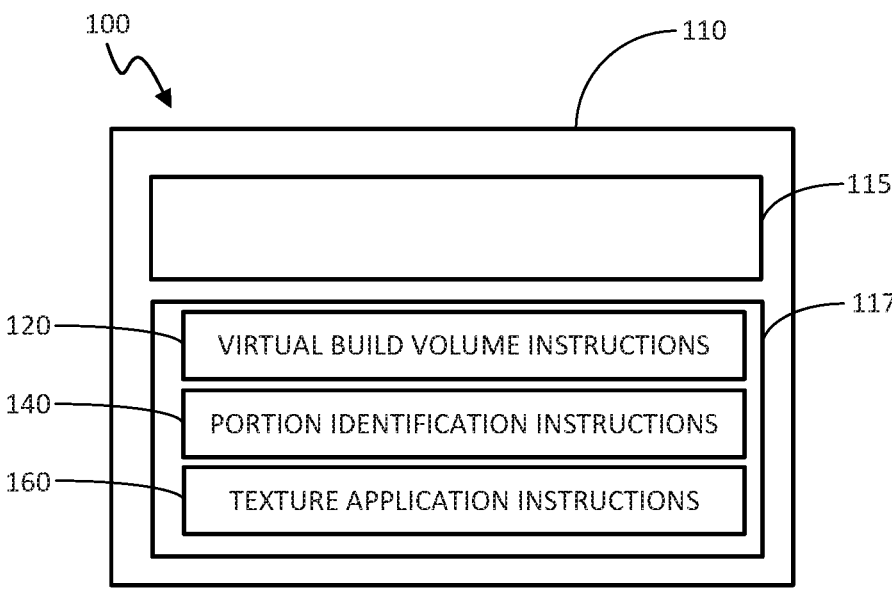

100
110
115
117

120 — VIRTUAL BUILD VOLUME INSTRUCTIONS

140 — PORTION IDENTIFICATION INSTRUCTIONS

160 — TEXTURE APPLICATION INSTRUCTIONS

Figure 1

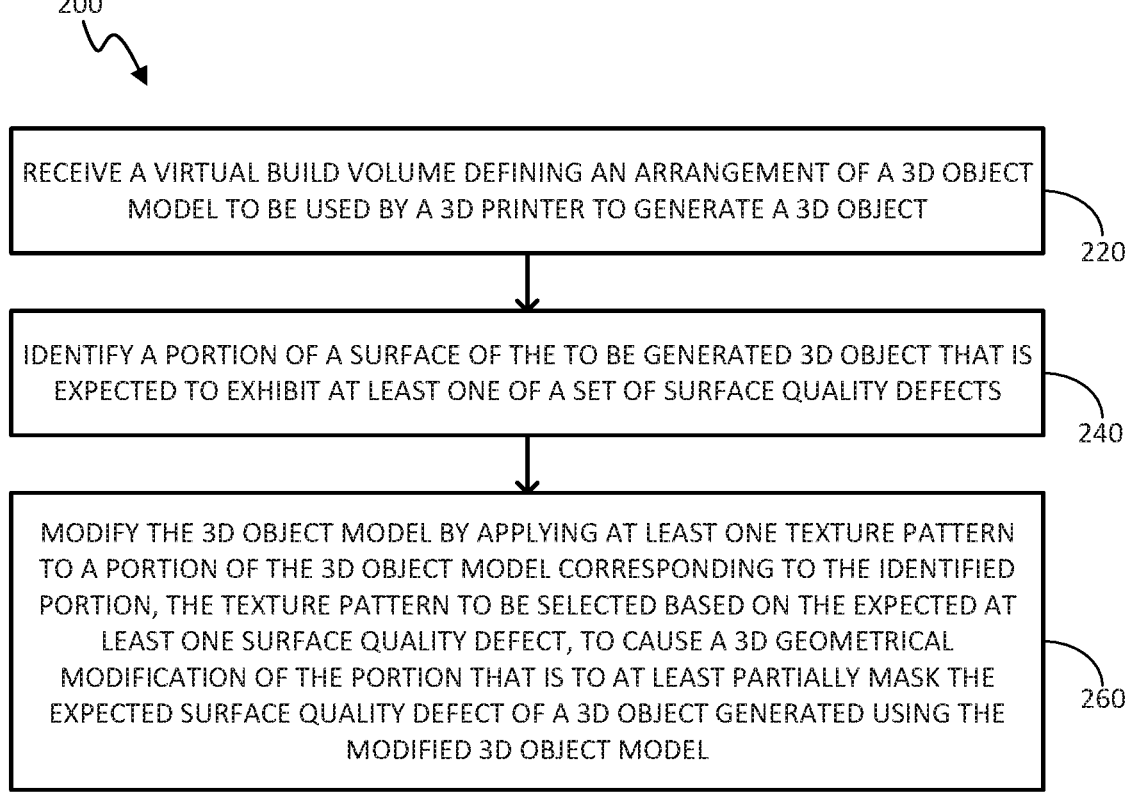

200

RECEIVE A VIRTUAL BUILD VOLUME DEFINING AN ARRANGEMENT OF A 3D OBJECT MODEL TO BE USED BY A 3D PRINTER TO GENERATE A 3D OBJECT
220

IDENTIFY A PORTION OF A SURFACE OF THE TO BE GENERATED 3D OBJECT THAT IS EXPECTED TO EXHIBIT AT LEAST ONE OF A SET OF SURFACE QUALITY DEFECTS
240

MODIFY THE 3D OBJECT MODEL BY APPLYING AT LEAST ONE TEXTURE PATTERN TO A PORTION OF THE 3D OBJECT MODEL CORRESPONDING TO THE IDENTIFIED PORTION, THE TEXTURE PATTERN TO BE SELECTED BASED ON THE EXPECTED AT LEAST ONE SURFACE QUALITY DEFECT, TO CAUSE A 3D GEOMETRICAL MODIFICATION OF THE PORTION THAT IS TO AT LEAST PARTIALLY MASK THE EXPECTED SURFACE QUALITY DEFECT OF A 3D OBJECT GENERATED USING THE MODIFIED 3D OBJECT MODEL
260

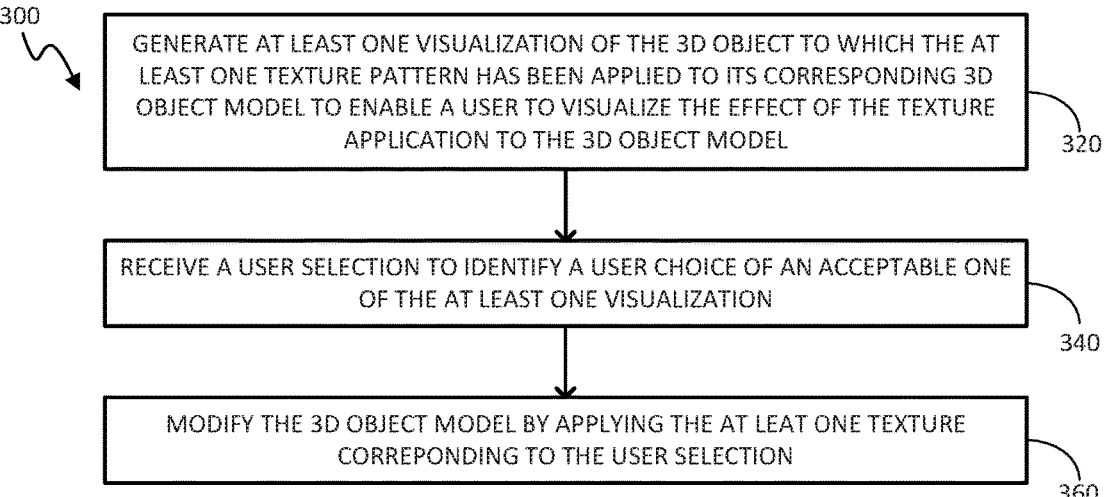

GENERATE AT LEAST ONE VISUALIZATION OF THE 3D OBJECT TO WHICH THE AT LEAST ONE TEXTURE PATTERN HAS BEEN APPLIED TO ITS CORRESPONDING 3D OBJECT MODEL TO ENABLE A USER TO VISUALIZE THE EFFECT OF THE TEXTURE APPLICATION TO THE 3D OBJECT MODEL

320

RECEIVE A USER SELECTION TO IDENTIFY A USER CHOICE OF AN ACCEPTABLE ONE OF THE AT LEAST ONE VISUALIZATION

340

MODIFY THE 3D OBJECT MODEL BY APPLYING THE AT LEAT ONE TEXTURE CORREPONDING TO THE USER SELECTION

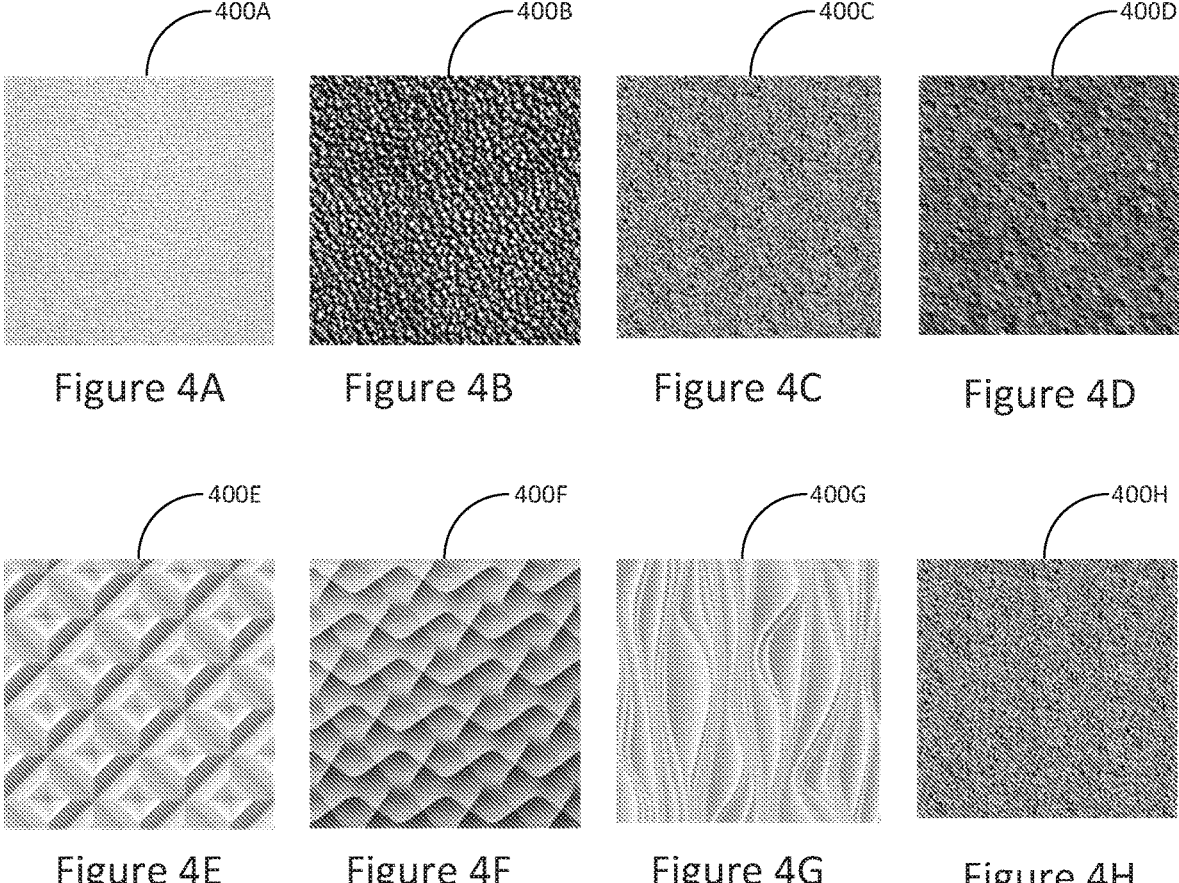

APPLYING TEXTURE PATTERNS TO 3D OBJECT MODELS

BACKGROUND

Some additive manufacturing or three-dimensional printing systems generate 3D objects by selectively solidifying portions of a successively formed layers of build material on a layer-by-layer basis. The build material which has not been solidified is separated from the 3D objects.

BRIEF DESCRIPTION OF THE DRAWINGS

The present application may be more fully appreciated in connection with the following detailed description of non-limiting examples taken in conjunction with the accompanying drawings, in which like reference characters refer to like parts throughout and in which:

FIG. 1 is a schematic diagram showing an example of a computing system to apply a texture pattern to a portion of a 3D object model;

FIG. 2 is a flowchart of an example method of applying a texture pattern to a portion of a 3D object model;

FIG. 3 is a flowchart of an example method of modifying a 3D object model by applying a texture pattern based on a user selection;

FIGS. 4A-4H are images of example texture patterns to be applied to a portion of a 3D object model;

DETAILED DESCRIPTION

Figure 5:
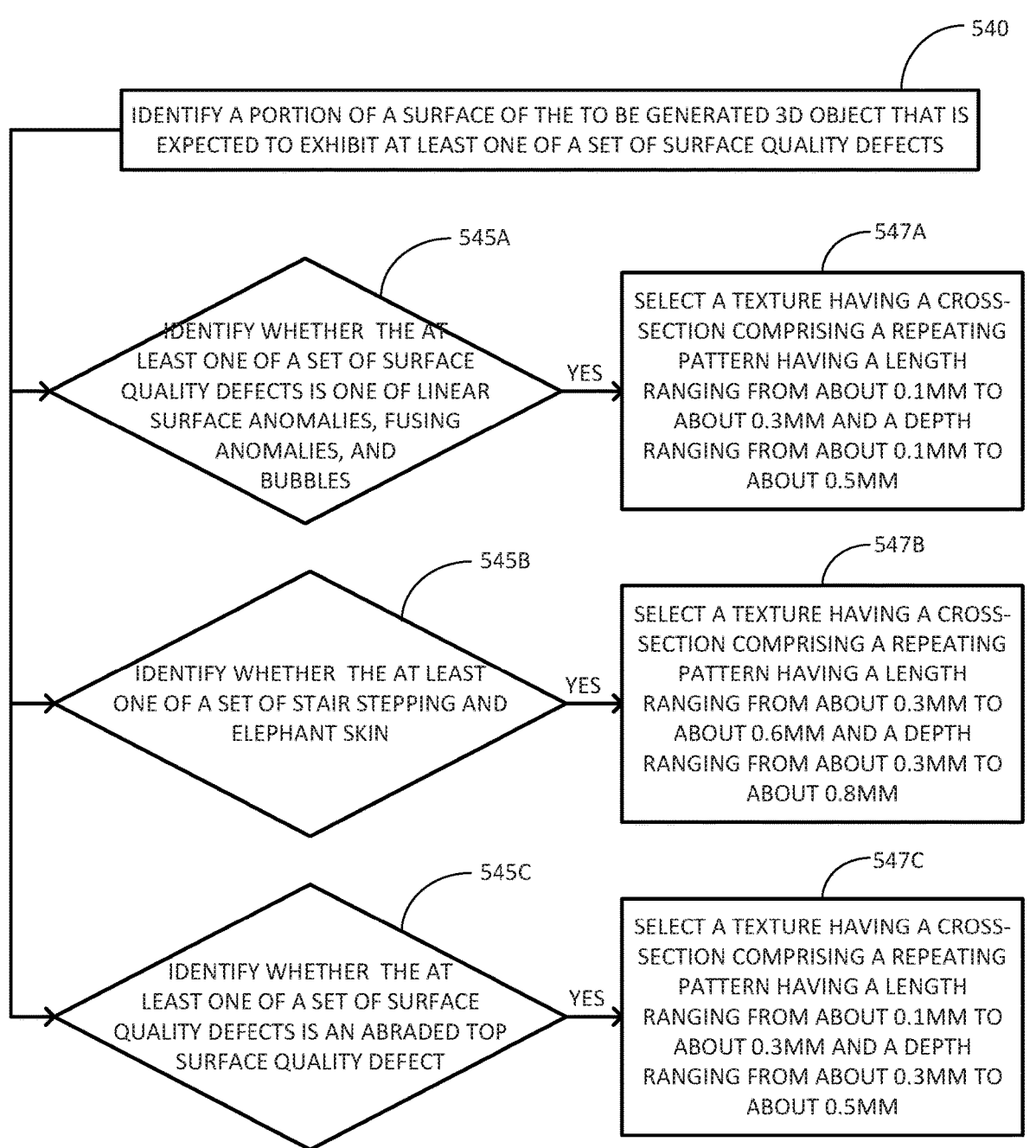
FIG. 5 is a schematic diagram showing an example method of selecting a texture.

The following description is directed to various examples of additive manufacturing, or three-dimensional printing, apparatus and processes involved in the generation of 3D objects. Throughout the present disclosure, the terms "a" and "an" are intended to denote at least one of a particular element. In addition, as used herein, the term "includes" means includes but not limited to, the term "including" means including but not limited to. The term "based on" means based at least in part on.

As used herein, the terms "about" and "substantially" are used to provide flexibility to a range endpoint by providing that a given value may be, for example, an additional 15% more or an additional 15% less than the endpoints of the range. In another example, the range endpoint may be an additional 30% more or an additional 30% less than the endpoints of the range. The degree of flexibility of this term can be dictated by the particular variable and would be within the knowledge of those skilled in the art to determine based on experience and the associated description herein.

For simplicity, it is to be understood that in the present disclosure, elements with the same reference numerals in different figures may be structurally the same and may perform the same or similar functionality.

3D printers generate 3D objects based on data in a 3D model of an object or objects to be generated, for example, using a CAD computer program product. This data may be pre-processed by a computing system in a suitable format for the 3D printer. In some examples, the pre-processing may include arranging the 3D objects models of the 3D objects to be generated in a virtual build volume corresponding to the physical build volume in which the 3D objects are to be generated, for example in a 3D printer. A print job, or other data, describing the arrangement of 3D objects models within the virtual build volume may be sent to the 3D printer to cause the printer to generate the 3D objects.

3D printers may generate 3D objects by selectively processing layers of build material. For example, a 3D printer may selectively treat portions of a layer of build material, e.g. a powder, corresponding to a slice of 3D object to be generated, thereby leaving the portions of the layer un-treated in the areas where no 3D object is to be generated. The combination of the generated 3D objects and the un-treated build material may also be referred to as build bed. The volume in which the build bed is generated may be referred to as a build volume.

Suitable powder-based build materials for use in additive manufacturing include polymer powder, metal powder or ceramic powder. In some examples, non-powdered build materials may be used such as gels, pastes, and slurries.

Some 3D printers may selectively treat portions of a layer of build material by ejecting a printing fluid in a pattern corresponding to the 3D object and then apply energy to the layer. 3D printers may apply energy to the build material layer, using for example, an energy source. Examples of printing fluids may include fusing agents, detailing agents, curable binder agents or any printing fluid suitable for the generation of a 3D object. After the 3D printing operation corresponding to the generation of the 3D objects within a plurality of build material layers, the build bed may be allowed to cool down so that the 3D objects may be separated from the un-solidified build material.

The 3D objects may undergo a distortion during the fabrication process which may lead to differences between the intended shape of the object and the actual printed object. This distortion, referred hereinafter as part quality defects, such of which may affect the overall geometry of the part, and some of which may affect the appearance of surfaces of the part. Part quality defects may be influenced, for example, by 3D printer configurations, build material characteristics and the arrangement of the 3D object model within the virtual build volume.

Referring now to the drawings, FIG. 1 is schematic diagram showing an example of a computing system 100. The computing system 100 may be an integral part of a 3D printer or an external system from the 3D printer that may interact with the 3D printer, for example an external computing unit suitable for sending data to the 3D printer.

The computing system 100 comprises a controller 110. The controller 110 comprises a processor 115 and a memory 117 with specific control instructions 120-160 to be executed by the processor 115. The functionality of the controller 110 is described further below with reference to FIG. 2.

In the examples herein, the controller 110 may be any combination of hardware and programming that may be implemented in a number of different ways. For example, the programming of modules may be processor-executable instructions stored in at least one non-transitory machine-readable storage medium and the hardware for modules may include at least one processor to execute those instructions. In some examples described herein, multiple modules may be collectively implemented by a combination of hardware and programming. In other examples, the functionalities of the controller 110 may be, at least partially, implemented in the form of an electronic circuitry. The controller 110 may be a distributed controller, a plurality of controllers, and the like. In the examples herein, texture patterns may be applied to portions of a surface of a 3D object model to modify the surface geometry of the portions. These 3D surface geometry modifications are to, at least partially, mask a surface quality defect that it is expected to appear to said portions of a 3D object generated using the modified 3D object model.

FIG. 2 is a flowchart of an example method 200 of applying a texture pattern to a portion of a 3D object model. The blocks 220-260 from method 200 correspond to the instructions 120-160 from FIG. 1 respectively, instructions of which when executed, cause the processor 115 of the controller 110 to perform the method 200 of FIG. 2.

At block 220, the controller 110 receives a virtual build volume defining an arrangement of a 3D object model to be used by a 3D printer to generate a 3D object. The arrangement comprises the position and orientation of the 3D object model within the virtual build volume. In some examples, the controller 110 may receive an arrangement with a plurality of 3D object models in the virtual build volume. In even further examples, the controller 110 may receive data corresponding to a plurality of 3D objects to be generated and may arrange the corresponding plurality of 3D object models in the virtual build volume.

Different portions of a generated 3D object may exhibit different part or surface quality defects based on the geometry of the different portions, the location within the build volume in which the portions are arranged, or the orientation of the portions of the 3D object with respect to the build volume. At block 240, the controller 110 identifies a portion of a surface of the to be generated 3D object that is expected to exhibit a surface quality defect. In some instances, the controller 110 may identify a plurality of surface quality defects that may be present on the surface of the 3D object when generated. In some examples, the controller may determine a surface quality defect in the portion of the 3D objects from a set of part quality defects based on, for example, a set of rules to be applied to the arrangement of the 3D object models in the virtual build volume. Some of these examples are disclosed below.

Some examples of surface quality defects may comprise stair-stepping, linear surface anomalies, voids, bubbles, sinks, fusing anomalies, abraded top, and so-called 'elephant skin'.

Stair stepping or linear surface anomalies, is a part quality defect in which lines are visible on a surface of a generated 3D object. The abraded top is a part quality defect in which part of a surface of a 3D object does not completely fuse and becomes rough. The fusing anomalies are visible part quality defects that may occur, for example, when a set of nozzles from a printhead become clogged and to which certain object geometries may be sensitive. The generation of stair stepping or linear surface anomalies, the abraded top and the fusing anomalies are disclosed below in further detail.

Elephant skin is a part quality defect in which a surface of the 3D object folds during object generation and thereby deforms into an orange peel, or elephant skin-type pattern. The elephant skin part quality defect appears when the build material surrounding the 3D object is cooler than intended which leads to non-homogeneous shrinkage As mentioned above, some 3D printing technologies eject agents to the print bed to generate the 3D object. Some of these agents comprise a liquid carrier (e.g., water) which may, at least in part, evaporate during the printing process, causing the potential formation of bubbles. In objects having certain geometries (such as those with thick walls or relatively large solid regions), the gas generated by the evaporation of the liquid carrier may migrate towards an outer wall of the 3D object due to the pressure gradient. In some examples, for example in 3D objects with thin walls (e.g., 0.5 mm-2.5 mm), the bubbles may reach the outer wall of the 3D object thereby generating spherical pores, typically less than about 1 mm in diameter. This part-quality defect is referred to herein as "bubbles". In other examples, for example in 3D objects with thicker walls (e.g., 2 mm-3 mm), the bubbles may tend to group together in the 3D object and then reach the outer wall of the 3D object, thereby generating larger, and sometimes irregular, pores, having a diameter or opening in the range of about 1 mm to about 7 mm. This part-quality defect is referred to herein as "voids". In yet other examples, for example in 3D objects with even thicker walls (e.g., over about 3 mm), the pores may be of an even larger in size, which may cause collapsing or sinking of a portion of the object. This part-quality defect is herein referred to as "sinks".

At block 260, the controller 110 applies at least one texture pattern to the external surface of the portion of the 3D object model corresponding to the identified portion (block 240). Examples of texture patterns are disclosed below. The controller 110 selects a suitable texture pattern based on the expected surface quality defect and applies the texture to at least a portion of the 3D object model. The application of the texture to the portion of the 3D object model causes a 3D geometrical modification of the portion. When a 3D object is generated using the modified 3D object model, the characteristics of the 3D geometrical modifications of the portion are to either fully or substantially mask the expected part quality defects, such that the surface quality is improved compared to an object generated from a 3D object model to which no texture is applied. In the examples herein, the term "mask" should be interpreted as either that the printed surface is closer in appearance as the intended surface in the 3D object model, or as that the printed surface is visually more aesthetic than if no modification had been made. In some examples, the controller 110 applies the selected texture pattern on the portion of the 3D object model only in which the part quality defect is expected to appear. Additionally, in other examples, the controller 110 further applies the selected texture pattern to additional portions of the object model, even though the part quality defect in not expected to appear in the additional portions of the corresponding 3D object. In some examples, the controller 110 applies the selected texture pattern to all the external surfaces of the 3D object model.

In some examples, the controller 110 is to select the texture pattern using a look-up table (LUT) or a data library. In an example, the LUT is a data table that matches some available texture patterns with at least one set of surface quality defects that the texture patterns may be able to mask. In other examples, the LUT is a data table that matches some surface quality defects with a set of texture patterns that may be used to mask each of the surface quality defects. Additionally, in some examples, the controller 110 is to identify that a portion of the 3D object is expected to exhibit a plurality of surface quality defects. In these examples, the controller 110 may then identify a set of texture patterns that may, at least partially, mask the plurality of surface quality defects (block 260). In some examples, the controller 110 may automatically select a texture pattern from the identified set of texture patterns to mask the plurality of surface quality defects. In these examples, the controller 110 may then apply the automatically selected texture pattern to the portion of the 3D object corresponding to the portion of the 3D object which is to exhibit the plurality of part quality defects. In other examples, however, the selection may not be made automatically (see, e.g., method 300 of FIG. 3).

In some examples, after the printing operation, the generated 3D objects may be subject to a post-processing operation, for example, a bead-blasting operation or a chemical polishing operation. Some texture patterns may enhance the post-processing operation efficiency, whereas other texture patterns may complicate the post-processing operation. In these examples, the controller 110 may receive post-processing data indicative of the post-processing operation to be performed on the 3D object. The controller 110 may then select a texture pattern based on the identified set of surface quality defects and the post-processing operation. The controller 110 may further apply the selected texture pattern to the portion of the 3D object model corresponding to the portion of the 3D object which is to exhibit the set of part quality defects.

FIG. 3 is a flowchart of an example method 300 of modifying a 3D object model by applying a texture based on a user selection. As mentioned above, in some examples, the controller 110 may identify that a portion of the 3D object is expected to exhibit a plurality of surface quality defects and may then further identify the set of texture patterns that, once applied, are to mask the plurality of surface quality defects (i.e., block 260 of FIG. 2). In some examples, method 300 may be executed after block 240 from FIG. 2.

At block 320, the controller 110 generates at least one visualization of the 3D object to which the at least one texture pattern has been applied to its corresponding object model to enable the user to visualize the effect on a 3D printed object of applying the texture to the 3D object model. In some examples, the visualization is output to the computer system 100 screen. In other examples, the visualization is output to a 3D printer screen. In yet other examples, the visualization is output through a portable device, such as a cellphone (e.g., through a downloadable application). In some examples, the 3D object model may be modified so that different portions of the 3D object have different textures patterns applied thereto. In other examples, the 3D object model may be modified so that a texture pattern is applied to substantially the entire outer surface of the 3D object, for example, to ensure aesthetic uniformity.

At block 340, the controller 110 may receive the user selection to identify the user choice of an acceptable one of the output visualizations. The controller 110 may therefore allow the user to select a preferred texture pattern solution. At block 360, the controller 110 modifies the 3D object model by applying the texture pattern corresponding to the user selection.

FIGS. 4A-4H are images of example texture patterns 400A-H to be applied to a portion of a 3D object model.

As mentioned above, a texture pattern, once applied to the portion of a 3D object, causes a 3D geometrical modification of the portion. A texture pattern may define a three-dimensional pattern. A texture pattern may, for example, have its cross-section having a repeating pattern (e.g., a wave) having a length and a height. The length of the pattern may be interpreted as the distance between two consecutive repeating features from the pattern, for example, the distance between the two consecutive highest peaks. In the example in which the pattern is a sinusoidal wave, the length of the pattern would be the frequency of the wave. The height of the pattern may be considered as the distance between the most distant features within a repeating pattern, for example, the distance between the highest peak and the lowest peak of the pattern. In the example in which the pattern is a sinusoidal wave, the height of the pattern would be the amplitude of the wave. The length and height of a texture pattern as applied to a printed 3D object may be measured by using, for example, a 3D scanning device or a rugosimeter.

In an example, the texture patterns from 400E-H are represented as bitmap images in which the shades of grey represent a surface height modification to be applied to the object surface (e.g., a texture map or a displacement map). For example, a mid-gray may represent a modification of a certain amplitude in one direction, where black represents no modification, and where white represents a modification of a certain amplitude in an opposite direction.

Some patterns have lower heights and lengths than others. For example, patterns 400A-D corresponding to FIGS. 4A-D have lower heights and lengths than patterns 400E-H corresponding to FIGS. 4E-H. Therefore, in some examples, patterns 400A-D may be referred to as fine textures and patterns 400E-H may be referred to as rough textures.

Fine textures may comprise a length ranging from about 0.1 mm to about 0.3 mm and a height ranging from about 0.1 mm and about 0.5 mm. Some examples of fine textures are smooth leather texture 400A, rough leather texture 400B, rough wall texture 400C and cratered surface texture 400D. Other fine textures may be used having different shapes but similar length and height values as the exemplified above. Rough textures may comprise a length ranging from about 0.3 mm to about 0.6 mm and a height ranging from about 0.3 mm to 0.8 mm. Some examples of rough textures are pyramid texture 400E, regular waves texture 400F, irregular waves texture 400G and rough wall texture 400H (with higher height than rough wall texture 400C). Other rough textures may be used having deep geometrical or random patterns given that the height of the pattern is high enough to mask the surface quality defects they are used for.

FIG. 5 is a schematic diagram showing an example method 500 of selecting a texture.

At block 540, the controller 110 identifies a portion of a surface of the to be generated 3D object that is expected to exhibit at least one surface quality defect. Block 540 may be the same as block 240 from FIG. 2.

At decision block 545A, the controller 110 identifies whether the at least one surface quality defect is one of linear surface anomalies, fusing anomalies and/or bubbles. If it is so identified (i.e., YES), at block 547A, the controller 110 is to select a texture pattern having a cross-section comprising a repeating pattern having a length ranging from about 0.1 mm to about 0.3 mm and a height ranging from about 0.1 mm to about 0.5 mm, for example, the smooth leather pattern 400A, rough leather pattern 400B, rough wall pattern 400C and/or cratered surface pattern 400D.

At decision block 545B, the controller 110 identifies whether the at least one surface quality defect is one of elephant skin and/or stair stepping. If it is so identified (i.e., YES), at block 547B, the controller 110 is to select a texture having a cross-section comprising a repeating pattern having a length ranging from about 0.3 mm to about 0.6 mm and a height ranging from about 0.3 mm to about 0.8 mm, for example, the pyramid pattern 400E, regular waves pattern 400F, irregular waves pattern 400G and/or rough wall pattern 400H.

At decision block 545C, the controller 110 identifies whether the at least one surface quality defect is an abraded top part quality defect. If it is so identified, at block 547C, the controller 110 is to select a texture having a cross-section comprising a repeating pattern having a length ranging from about 0.1 mm to about 0.3 mm and a height ranging from about 0.3 mm to about 0.5 mm, for example, the pyramid pattern 400E and/or the rough leather pattern 400B.

Figure 6A:
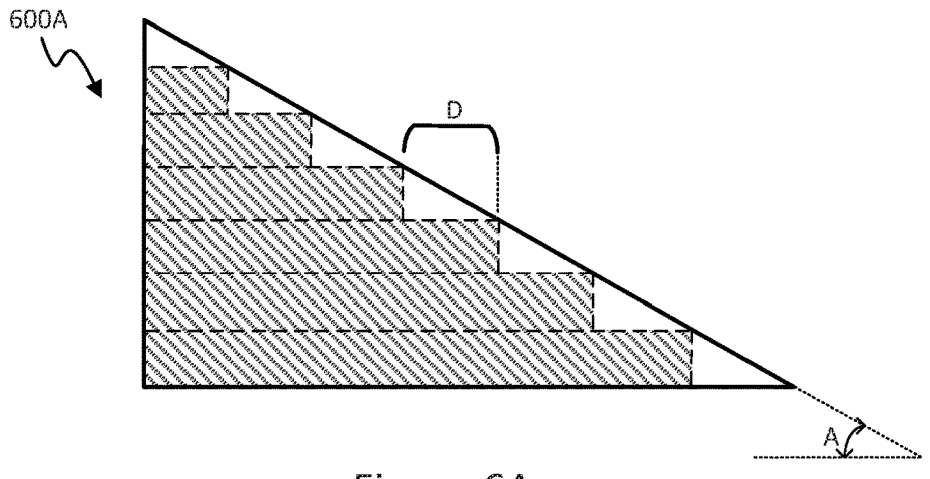
FIG. 6A is a schematic diagram showing an example of 3D object model, 3D object of which is expected to exhibit a stair stepping surface quality defect.

FIG. 6A is a schematic diagram showing an example of 3D object model 600A, 3D object of which is expected to exhibit a stair stepping surface quality defect.

Manufacturing in a layer-by layer manner, such as in 3D printing, involves a discretization along the vertical axis according to the layer thickness. Therefore, the visibility of these layers (or lines) is based on the thickness of the layer and the orientation of the 3D object model within the virtual build volume. Small angles with respect the horizontal plane (e.g., angle A) may cause the endpoints of the layers which are part of the 3D object to be generated, to be separated by larger distance (e.g., distance D) than wider angles with respect the horizontal plane. The larger the distance D, the more visible lines the 3D object will show.

In an example in which the layer thickness is of about 80 to 110 microns, stair step defects may be visible when the orientation of planar surfaces of the 3D object model with respect to a virtual horizontal plane are of angles greater than about 10, 15, 20 or 30 degrees.

The controller 110 may therefore determine whether a portion of the 3D object comprises a non-horizontal surface. Where it is so determined, the controller 110 may further determine whether the non-horizontal surface is expected to exhibit a stair-stepping surface quality defect based on the layer thickness and the angle of the non-horizontal surface.

Figure 6B:
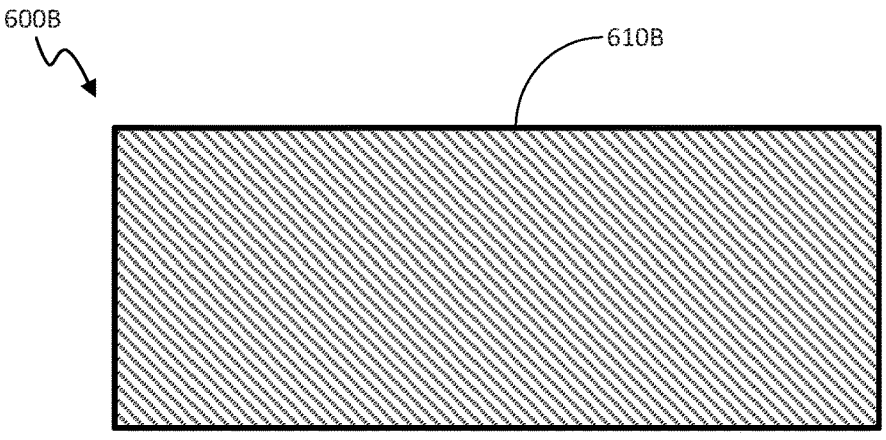
FIG. 6B is a schematic diagram showing an example of 3D object model, 3D object of which is expected to exhibit an abraded top surface quality defect.

FIG. 6B is a schematic diagram showing a front view of an example of 3D object model, 3D object of which may exhibit an abraded top surface quality defect.

Abraded top surface quality defects appear where the virtual build volume comprises a relatively large and horizontal area 610B towards the top of the virtual build volume. In this situation, the 3D printer may add a large amount of detailing agent to control temperatures within the build bed. In certain circumstances, the detailing agent may unbalance the fusing process of the large area 610B and cause the abraded top surface quality defect, which may involve irregularities on the surface 610B, the color homogeneity and the local roughness. It is therefore recommended to orient the 3D object model within the virtual build model in such a way that the horizontal top surface area 610B is minimized.

The controller 110 may therefore determine whether the 3D object model comprises an upper-facing horizontal surface 610B. Where it is so determined, the controller 110 may further determine that the upper-facing horizontal surface of the 3D object is expected to exhibit an abraded top surface quality defect.

Figure 6C:
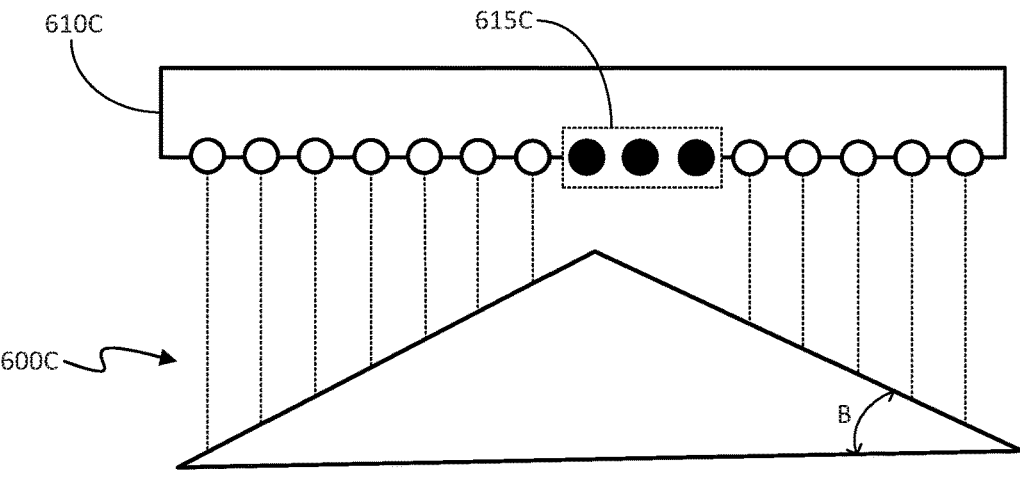
FIG. 6C is a schematic diagram showing an example of 3D object model, 3D object of which is expected to exhibit fusing anomalies surface quality defect.

FIG. 6C is a schematic diagram showing an example of 3D object 600C which may exhibit fusing anomalies surface quality defect.

In some instances, a number of consecutive nozzles 615C of a printhead 610C may clog. This causes the no-ejection of printing fluids, such as fusing agent and/or detailing agent, to the areas below the clogged nozzles 615C within the print area, which may be visibly appreciable after the completion of the printing process. It may also affect the mechanical properties of the to be generated 3D object 600C. Furthermore, if the 3D object 600C comprises a surface oriented at a big angle with respect to the horizontal plane, the area below the clogged nozzles 615C which is affected, may be bigger than if the surface would have been oriented at a smaller angle.

The controller 110 may therefore determine whether the 3D object model comprises a non-horizontal surface. Where it is so determined, the controller 110 may further compare the angle with respect the horizontal plane (e.g., angle B) with an angle threshold. Some examples of angle thresholds are about 40, 45, 50, 60, 75, or 90 degrees. If the angle exceeds the angle threshold, the controller 110 may determine that, in the event that the consecutive nozzles 615C are clogged, the non-horizontal surface of the 3D object may exhibit a noticeable fusing anomalies surface quality defect.

Figure 7:
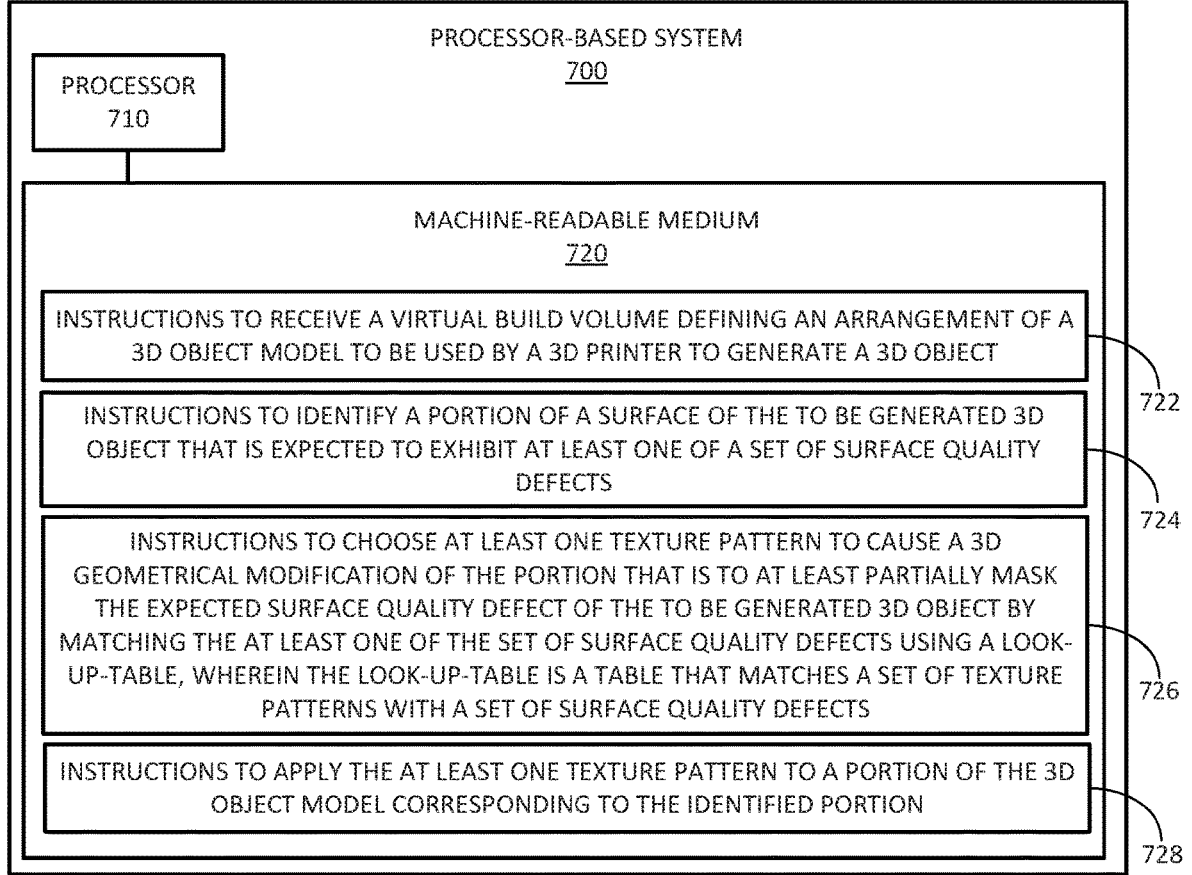
FIG. 7 is a block diagram showing a processor-based system example of a system to apply a texture pattern to a portion of a 3D object model.

FIG. 7 is a block diagram showing a processor-based system example of a system to apply a texture pattern to a portion of a 3D object model. In some implementations, the system 700 may be or may form part of a computing system and/or a 3D printing system, such as a 3D printer. In some implementations, the system 700 is a processor-based system and may include a processor 710 coupled to a machine-readable medium 720. The processor 710 may include a single-core processor, a multi-core processor, an application-specific integrated circuit (ASIC), a field programmable gate array (FPGA), and/or any other hardware device suitable for retrieval and/or execution of instructions from the machine-readable medium 720 (e.g., instructions 722-728) to perform functions related to various examples. Additionally, or alternatively, the processor 710 may include electronic circuitry for performing the functionality described herein, including the functionality of instructions 722-728. With respect of the executable instructions represented as boxes in FIG. 7, it should be understood that part or all of the executable instructions and/or electronic circuits included within one box may, in alternative implementations, be included in a different box shown in the figures or in a different box not shown.

The machine-readable medium 720 may be any medium suitable for storing executable instructions, such as a random-access memory (RAM), electrically erasable programmable read-only memory (EEPROM), flash memory, hard disk drives, optical disks, and the like. In some example implementations, the machine-readable medium 720 may be a tangible, non-transitory medium, where the term "non-transitory" does not encompass transitory propagating signals. The machine-readable medium 720 may be disposed within the processor-based system 700, as shown in FIG. 7, in which case the executable instructions may be deemed "installed" on the system 700. Alternatively, the machine-readable medium 720 may be a portable (e.g., external) storage medium, for example, that allows system 700 to remotely execute the instructions or download the instructions from the storage medium. In this case, the executable instructions may be part of an "installation package". As described further herein below, the machine-readable medium may be encoded with a set of executable instructions 722-728.

Instructions 722, when executed by the processor 710, may cause the processor 710 to receive a virtual build volume defining an arrangement of a 3D object model to be used by a 3D printer to generate a 3D object.

Instructions 724, when executed by the processor 710, may cause the processor 710 to identify a portion of a surface of the to be generated 3D object that is expected to exhibit at least one of a set of surface quality defects.

Instructions 726, when executed by the processor 710, may cause the processor 710 to choose at least one texture pattern to cause a 3D geometrical modification of the portion and at least partially mask the expected surface quality defect of the to be generated 3D object by matching the at least one of the set of surface quality defects using a LUT. A LUT is a table that matches a set of texture patterns with a set of surface quality defects.

Instructions 728, when executed by the processor 710, may cause the processor 710 to apply the at least one texture pattern to a portion of the 3D object model corresponding to the identified portion.

The above examples may be implemented by hardware, or software in combination with hardware. For example, the various methods, processes and functional modules described herein may be implemented by a physical processor (the term processor is to be implemented broadly to include CPU, SoC, processing module, ASIC, logic module, or programmable gate array, etc.). The processes, methods and functional modules may all be performed by a single processor or split between several processors; reference in this disclosure or the claims to a "processor" should thus be interpreted to mean "at least one processor". The processes, method and functional modules are implemented as machine-readable instructions executable by at least one processor, hardware logic circuitry of the at least one processor, or a combination thereof.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

The drawings in the examples of the present disclosure are some examples. It should be noted that some units and functions of the procedure may be combined into one unit or further divided into multiple sub-units. What has been described and illustrated herein is an example of the disclosure along with some of its variations. The terms, descriptions and figures used herein are set forth by way of illustration. Many variations are possible within the scope of the disclosure, which is intended to be defined by the following claims and their equivalents.

There have been described example implementations with the following sets of features:

Feature set 1: A computing system comprising a controller to:

receive a virtual build volume defining an arrangement of a 3D object model to be used by a 3D printer to generate a 3D object;

identify a portion of a surface of the to be generated 3D object that is expected to exhibit at least one of a set of surface quality defects; and modify the 3D object model by applying at least one texture pattern to a portion of the 3D object model corresponding to the identified portion, the texture pattern to be selected based on the expected at least one surface quality defect, to cause a 3D geometrical modification of the portion that is to at least partially mask the expected surface quality defect of a 3D object generated using the 3D object model.

Feature set 2: A computing system with feature set 1, wherein the controller is further to: (i) generate at least one visualization of the 3D object to which the at least one texture pattern has been applied to its corresponding 3D object model to enable a user to visualize the effect of the texture application to the 3D object model; (ii) receive a user selection to identify a user choice of an acceptable one of the at least one visualization; and (iii) modify the 3D object model by applying the at least one texture corresponding to the user selection.

Feature set 3: A computing system with preceding feature set 2, wherein the controller is to identify the portion of the 3D object that is expected to exhibit at least one surface quality defect from the list of stair-stepping, linear surface anomalies, voids, bubbles, sinks, fusing anomalies, abraded top, and elephant skin.

Feature set 4: A computing system with any preceding feature set 2 to 3, wherein the controller is to: choose the at least one texture pattern by matching the at least one set of surface quality defects using a look-up-table; wherein the look-up-table is a table that matches a set of texture patterns with a set of surface quality defects.

Feature set 5: A computing system with any preceding feature set 2 to 4, wherein the controller is to identify whether the portion of the 3D object is expected to exhibit a plurality of surface quality defects, the controller being further to: (i) automatically select a texture pattern from the identified at least one texture pattern that is to mask the plurality of surface quality defects; and (ii) apply the texture pattern to the portion of the 3D object model.

Feature set 6: A computing system with any preceding feature set 1 to 5, wherein the controller is further to: (i) receive post-processing data indicative of a post-processing operation to be performed on the 3D object; (ii) select a texture pattern based on the at least one of a set of surface quality defects and the post-processing operation; and (iii) apply the texture pattern to the portion of the 3D object model.

Feature set 7: A computing system with any preceding feature set 1 to 6, wherein the controller is further to: determine whether the at least one of a set of surface quality defects is one of linear surface anomalies, fusing anomalies, and bubbles; and where it is so determined, select a texture pattern having a cross-section comprising a repeating pattern having a length ranging from about 0.1 mm to about 0.3 mm and a height ranging from about 0.1 mm to about 0.5 mm.

Feature set 8: A computing system with any preceding feature set 1 to 7, wherein the controller is further to: determine whether the at least one of a set of surface quality defects is one of stair stepping and elephant skin; and where it is so determined, select a texture pattern having a cross-section comprising a repeating pattern having a length ranging from about 0.3 mm to about 0.6 mm and a height ranging from about 0.3 mm to about 0.8 mm.

Feature set 9: A computing system with any preceding feature set 1 to 8, wherein the controller is further to determine whether the at least one of a set of surface quality defects is an abraded top surface quality defect in the portion of the 3D object; and where it is so determined, select a texture pattern having a cross-section comprising a repeating pattern having a length ranging from about 0.1 mm to about 0.3 mm and a height ranging from about 0.3 mm to about 0.5 mm.

Feature set 10: A computing system with any preceding feature set 1 to 9, wherein the controller is further to determine the surface quality defect in the portion of the 3D object from the set of part quality defects based on a set of rules to be applied to the arrangement of the 3D object in the virtual build volume.

Feature set 11: A computing system with any preceding feature set 1 to 10, wherein the controller is further to: determine whether the portion of the 3D object model comprises a non-horizontal surface; and where it is so determined, determine whether the non-horizontal surface is expected to exhibit a stair stepping surface quality defect based on a thickness of a build material layer and the angle of the non-horizontal surface.

Feature set 12: A computing system with any preceding feature set 1 to 11, wherein the controller is further to: determine whether the 3D object model comprises a upper-facing horizontal surface; and where it is so determined, determine that the upper-facing horizontal surface of the 3D object is expected to exhibit an abraded top surface quality defect.

Feature set 13: A computing system with any preceding feature set 1 to 12, wherein the controller is further to: determine whether the 3D object model comprises a non-horizontal surface at an angle with respect a horizontal plane; and where it is so determined, compare the angle with an angle threshold; and determine that the non-horizontal surface of the 3D object is expected to exhibit a fusing anomalies surface quality defect if the angle exceeds the angle threshold.

Feature set 14: A method comprising:

receiving a virtual build volume defining an arrangement of a 3D object model to be used by a 3D printer to generate a 3D object;

identifying a portion of a surface of the to be generated 3D object that is expected to exhibit at least one of a set of surface quality defects from the list of stair-stepping, linear surface anomalies, voids, bubbles, sinks, fusing anomalies, abraded top, and elephant skin; and modifying the 3D object model by applying at least one texture pattern to a portion of the 3D object model corresponding to the identified portion, the texture pattern to be selected based on the expected at least one surface quality defect, to cause a 3D geometrical modi-fication of the portion that is to at least partially mask the expected surface quality defect of a 3D object generated using the modified 3D object model.

Feature set 15: A non-transitory machine-readable medium storing instructions executable by a processor, the non-transitory machine-readable medium comprising:

instructions to receive a virtual build volume defining an arrangement of a 3D object model to be used by a 3D printer to generate a 3D object;

instructions to identify a portion of a surface of the to be generated 3D object that is expected to exhibit at least one of a set of surface quality defects;

instructions to choose at least one texture pattern to cause a 3D geometrical modification of the portion that is to at least partially mask the expected surface quality defect of the to be generated 3D object by matching the at least one of the set of surface quality defects using a look-up-table, wherein the look-up-table is a table that matches a set of texture patterns with a set of surface quality defects; and instructions to apply the at least one texture pattern to a portion of the 3D object model corresponding to the identified portion.

What is claimed is:

1. A method comprising:

receiving, by a processor, a virtual build volume defining an arrangement of a 3D object model to be used by a 3D printer to generate a 3D object;

identifying, by the processor, a portion of a surface of the to-be-generated 3D object that is expected to exhibit one or more surface quality defects from a set of surface quality defects;

choosing, by the processor, at least one texture pattern to cause a 3D geometrical modification of the portion that is to at least partially mask the expected one or more surface quality defects of the to-be-generated 3D object by matching the expected one or more surface quality defects to the at least one texture pattern using a look-up-table that matches a set of texture patterns with the set of surface quality defects; and modifying, by the processor, the 3D object model by applying at the least one texture pattern to a portion of the 3D object model corresponding to the identified portion.

2. The method of claim 1, further comprising:

generating, by the processor, at least one visualization of the 3D object to which the at least one texture pattern has been applied to the 3D object model to enable a user to visualize effect of texture application to the 3D object model;

receiving, by the processor, user selection of an accept-able one of the at least one visualization; and modifying, by the processor, the 3D object model by applying the at least one texture pattern corresponding to the user selection.

3. The method of claim 1, wherein the portion of the 3D object is expected to exhibit the one or more surface quality defects selected from stair-stepping, linear surface anoma-lies, voids, bubbles, sinks, fusing anomalies, abraded top, and elephant skin.

4. The method of claim 1, further comprising identifying, by the processor, whether the portion of the 3D object is expected to exhibit surface quality defects from a plurality of sets of surface quality defects.

5. The method of claim 1, further comprising:

receiving, by the processor, post-processing data indica-tive of a post-processing operation to be performed on the 3D object, wherein the at least one texture pattern is selected based on the one or more surface quality defects and the post-processing operation.

6. The method of claim 1, further comprising:

determining, by the processor, that the one or more surface quality defects include one, or more than one of linear surface anomalies, fusing anomalies, and bubbles, wherein the at least one texture pattern is selected to have a cross-section comprising a repeating pattern having a length ranging from about 0.1 mm to about 0.3 mm and a height ranging from about 0.1 mm to about 0.5 mm.

7. The method of claim 1, further comprising:

determining, by the processor, that the one or more surface quality defects include either or both of stair-stepping and elephant skin, wherein the at least one texture pattern is selected to have a cross-section comprising a repeating pattern having a length ranging from about 0.3 mm to about 0.6 mm and a height ranging from about 0.3 mm to about 0.8 mm.

8. The method of claim 1, further comprising:

determining, by the processor, that the one or more surface quality defects include an abraded top surface quality defect in the portion of the 3D object, wherein the at least one texture pattern is selected to have a cross-section comprising a repeating pattern having a length ranging from about 0.1 mm to about 0.3 mm and a height ranging from about 0.3 mm to about 0.5 mm.

9. The method of claim 1, wherein the one or more surface quality defects in the portion of the 3D object are determined based on a set of rules to be applied to the arrangement of the 3D object in the virtual build volume.

10. The method of claim 9, further comprising:
determining, by the processor, that the portion of the 3D object model comprises a non-horizontal surface; and
determining, by the processor, that the non-horizontal surface is expected to exhibit a stair-stepping surface quality defect based on a thickness of a build material layer and an angle of the non-horizontal surface.

11. The method of claim 9, further comprising:
determining, by the processor, that the 3D object model comprises an upper-facing horizontal surface; and
determining, by the processor, that the upper-facing horizontal surface of the 3D object is expected to exhibit an abraded top surface quality defect.

12. The method of claim 9, further comprising:
determining, by the processor, that the 3D object model comprises a non-horizontal surface at an angle with respect to a horizontal plane;
comparing, by the processor, the angle with an angle threshold; and
determining, by the processor, that the non-horizontal surface of the 3D object is expected to exhibit a fusing anomalies surface quality defect in a case where the angle exceeds the angle threshold.

13. The method of claim 1, further comprising:
causing, by the processor, the 3D printer to generate the 3D object in accordance with the modified 3D object model.

14. A non-transitory machine readable medium storing instructions executable by a processor to perform processing comprising:
receiving a virtual build volume defining an arrangement of a 3D object model to be used by a 3D printer to generate a 3D object;
identifying a portion of a surface of the to-be-generated 3D object that is expected to exhibit a surface quality defect from a set of surface quality defects;
choosing at least one texture pattern to cause a 3D geometrical modification of the portion that is to at least partially mask the expected surface quality defect of the to-be-generated 3D object by matching the expected surface quality defect to the at least one texture pattern using a look-up-table that matches a set of texture patterns with the set of surface quality defects; and
applying the at least one texture pattern to a portion of the 3D object model corresponding to the identified portion.

15. The non-transitory machine readable medium of claim 14, wherein the processing further comprises:
causing the 3D printer to generate the 3D object in accordance with the 3D object model that has been modified via application of the at least one texture pattern.

16. A system comprising:
a processor; and
a memory storing instructions executable by the processor to perform processing comprising:
receiving a virtual build volume defining an arrangement of a 3D object model to be used by a 3D printer to generate a 3D object;
identifying a portion of a surface of the to-be-generated 3D object that is expected to exhibit a surface defect from a set of surface quality defects;
choosing at least one texture pattern to cause a 3D geometrical modification of the portion that is to at least partially mask the expected surface quality defect of the to-be-generated 3D object by matching the expected surface quality defect to the at least one texture pattern using a look-up-table that matches a set of texture patterns with the set of surface quality defects;
applying the at least one texture pattern to a portion of the 3D object model corresponding to the identified portion; and
causing the 3D printer to generate the 3D object in accordance with the 3D object model that has been modified via application of the at least one texture pattern.

17. The system of claim 16, further comprising the 3D printer, wherein the processor and memory are part of the 3D printer.

18. The system of claim 16, further comprising a computing device separate from the 3D printer,
wherein the processor and memory are part of the 3D printer.

19. The system of claim 18, further comprising the 3D printer.

* * * * *